Patented June 13, 1933

1,913,539

UNITED STATES PATENT OFFICE

HANS FRIEDRICH, OF BERLIN, GERMANY

PRODUCING MAGNESIUM AMMONIUM PHOSPHATE

No Drawing. Application filed July 31, 1930, Serial No. 472,197, and in Germany August 6, 1929.

My invention refers to the production of magnesium ammonium phosphate and more especially to means whereby this salt can be obtained in an almost anhydrous state.

In an application for patent of the United States, Serial No. 371,719, filed June 17, 1929 by Oscar Kaselitz, (Patent No. 1,881,195 Oct. 4, 1932) a process of producing magnesium ammonium phosphate has been described which comprises mixing waste liquors resulting in the recovery of potash salt from minerals containing same with a dilute solution resulting in the manufacture of phosphoric acid and containing a phosphate, adding aqueous ammonia to the mixture and drying the precipitated double salt $Mg(NH_4)PO_4.6H_2O$. The product thus obtained has the form of a voluminous meal which has been reduced to a more concentrated form by drying, whereby 5 mols. crystal water can be separated off. However this drying process involves a loss of ammonia and the salt does not lose its character of a fine meal.

I have now found that it is possible in practicing this process to obtain a precipitate of magnesium-ammonium-phosphate poorer in water of crystallization, if instead of ammonia solutions ammonia gas is used, and if the precipitation is carried through at a temperature above normal. This is surprising in view of the fact, that a concentrated ammonia solution will separate out in the heat only the hexa-hydrate.

In carrying the process out with gaseous ammonia I obtain a product having from 1–3 mols. water of crystallization, the exact amount depending on the temperature employed and on other conditions of reaction. In contradistinction to the hexa-hydrates these products have a coarsely crystalline character and can readily be filtered by suction and dried. The filtrates can be treated with lime and heated to recover the ammonia. An addition of lime to decompose the ammonia salts can be dispensed with, if the magnesium salts are replaced by magnesium oxide or hydroxide. In this case the surplus of ammonia need not be expelled, as the filtrates can be used in a succeeding operation.

In some cases it will prove advantageous to recover the dissolved ammonia salts as such. I can recover these salts in pure form if I use molecular quantities of phosphoric acid and magnesium salt.

In this case, if the phosphoric acid is replaced by an alkali phosphate, one obtains instead of the ammonium salts the corresponding alkali salts or a mixture of both. With a view to using these salts as fertilizers it is recommendable to start from potassium phosphates and magnesium nitrate. Preferably the ammonia gas is introduced into hot mother liquor resulting in a preceding operation, in which the potassium phosphate and the magnesium salt is dissolved. After the magnesium ammonium phosphate has been separated out, the mother liquor will on cooling separate out potassium nitrate and/or ammonium nitrate. If no magnesium ammonium phosphate is separated out, there results after cooling an intimate mixture of magnesium ammonium phosphate and potassium nitrate which forms a high-grade mixed fertilizer.

I have further found that it is also possible to carry out this reaction by acting with ammonia gas on the solid starting materials. Thus for instance the reaction between ammonia, concentrated phosphoric acid and magnesium oxide or hydroxide results in a solid product consisting of the mono-hydrate. By starting from potassium phosphate and magnesium nitrate a mixture of mono-hydrate and potassium nitrate is obtained. To these products other fertilizers can be admixed or similar mixtures can be obtained by admixing these fertilizers to the starting materials.

Example 1

175 grams $K_2HPO_4$ are dissolved together with 203 grams $MgCl_2.6H_2O$ in 390 grams water. The solution is heated to 90° C. and kept at this temperature and ammonia gas is introduced. The precipitate which is formed is filtered at once and rinsed with water of 90° C. After having been dried at 45° C. the precipitate weighs 160 grams. The yield of phosphate calculated for phosphoric acid is a quantitative one, the salt contains 45% $P_2O_5$, 25,5% MgO and 10,8% $NH_3$ or 98,8% $MgNH_4PO_4.1H_2O$.

*Example 2*

98.0 grams of a 100% phosphoric acid are mixed by stirring with 41 grams MgO and the mixture is treated with ammonia gas. The temperature of the mixture rises during this treatment and there is obtained an absolutely dry salt containing 45,6% $P_2O_5$, 25,9% MgO and 10,9% $NH_3$ or 99,8% $MgNH_4PO_4.1H_2O$.

Various changes may be made in the details disclosed in the foregoing specification without departing from the invention or sacrificing the advantages thereof.

I claim:—

The method of making magnesium ammonium phosphate containing only one molecule water comprising acting on a mixture of potassium phophate and magnesium chloride at about 90° C. with ammonia gas and separating the precipitate from the liquor.

In testimony whereof I affix my signature.

HANS FRIEDRICH.